Nov. 2, 1943.   V. B. NOVAK   2,333,549
RATCHET CHUCK
Filed May 25, 1942

Victor B. Novak, Inventor

By Glenn L. Fish, Attorney

Patented Nov. 2, 1943

2,333,549

UNITED STATES PATENT OFFICE 2,333,549

RATCHET CHUCK

Victor B. Novak, Vancouver, Wash.

Application May 25, 1942, Serial No. 444,469

5 Claims. (Cl. 192—43.2)

This invention relates to a tool holder or chuck and it is one object of the invention to provide a tool holder wherein a shaft having a tool receiving socket at its outer end is slidable longitudinally in a casing to adjusted positions for moving pawls carried by the shaft into and out of engagement with companion ratchet teeth carried by the casing and causing the shaft to turn with the casing in predetermined directions.

Another object of the invention is to provide a casing having front and rear ratchet teeth for engagement by front and rear pawls carried by the shaft, the annular wall of the casing having a portion between the ratchet teeth for shifting the pawls to a retracted inoperative position and thus rendering one set of pawls inactive while the other set of pawls are in extended operative position.

Another object of the invention is to provide a chuck or tool holder wherein sliding adjustment of the shaft is guided and the shaft prevented from having transverse play in the casing.

Another object of the invention is to so form the shaft and pawls that the pawls will be mounted for sliding movement through the shaft transversely thereof, the pawls being urged outwardly to operative position and formed with portions for guiding such movement and bracing the pawls when extended.

Another object of the invention is to provide a chuck which is simple in construction, easy to adjust and operate, and consisting of a few number of parts which are strong and not liable to become broken.

The invention is illustrated in the accompanying drawing, wherein.

Figure 1:
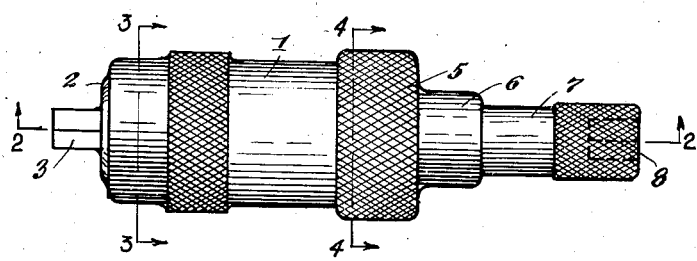
Fig. 1 is a side elevation of the improved chuck.
Figure 2:
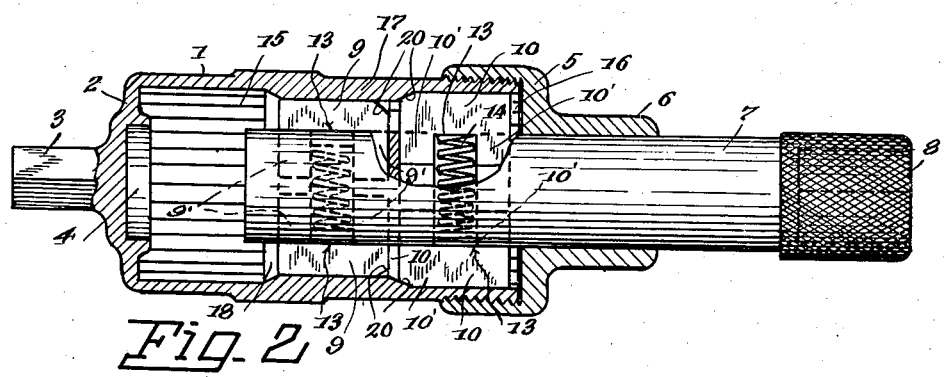
Fig. 2 is a sectional view taken longitudinally through the chuck.
Figure 3:
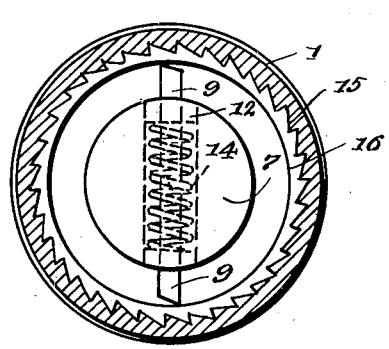
Fig. 3 is a sectional view taken transversely through the chuck on the line 3—3 of Fig. 1.
Figure 4:
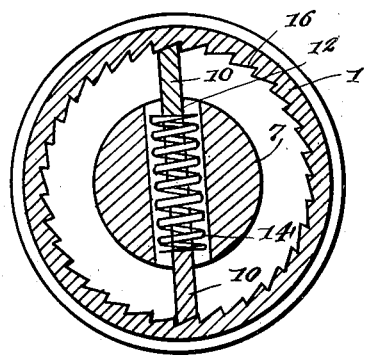
Fig. 4 is a transverse sectional view on the line 4—4 of Fig. 1.
Figure 5:
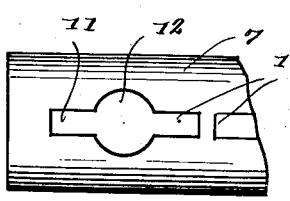
Fig. 5 is a fragmentary view of the shaft with the pawls removed.

This improved chuck has a cylindriral casing 1 formed of strong metal and having a head 2 at its rear end carrying a squared shank 3 and having its inner surface formed with a pocket 4 located centrally thereof. The front end of the casing is externally threaded and this end of the casing is closed by a cap 5 which is screwed into place on the casing and carries a forwardly projecting sleeve 6. Since the cap is screwed on the casing, it may be easily removed when necessary and again replaced.

A shaft 7 extends longitudinally of the casing through the sleeve 6 and, at its outer front end, is formed with a socket 8 to receive a tool or a nut to be turned in either a tightening or loosening direction. This shaft 7 carries sets of pawls 9 and 10 formed with arms 9' and 10' for engaging in slots 11 which project from opposite sides of circular openings 12 formed through the shaft transversely thereof. The arms 9' and 10' are spaced from each other transversely of the inner ends of the pawls and define recesses 13 to receive end portions of springs 14 which fit within the openings 12 and urge the pawls outwardly to extended operative position for engagement with ratchet teeth 15 and 16 formed about the inner surface of the annular wall of the casing and extending longitudinally of rear and front end portions thereof. The portion of the annular wall of the casing between the ratchet teeth 15 and 16 is internally thickened, as shown at 17, to form an annular surface which is offset inwardly with respect to the ratchet teeth and bordered along its side edges by beveled cam surfaces 18 and 19 serving to engage edges of the pawls and guide the pawls into engagement with the thickened portion of the casing where they will be held in retracted position. Corners of the cam-engaging edges of the pawls are cut diagonally, as shown at 20, so that the pawls will move across the cam surfaces 18 and 19 and into engagement with the surface of the thickened portion 17.

When this chuck is in use, its shank 3 is applied to a wrench, key or other turning tool and a boring tool may be engaged in the socket, or the socket engaged with a nut to be turned and tightened or loosened. If a nut is to be loosened, the shaft 7 is shifted forwardly to move the pawls 10 into engagement with the ratchet teeth 16 and, as the casing is turned in a loosening direction, the shaft will be turned with it. During this movement, the pawls 9 will be inactive as they are out of position for engaging the teeth 15 and held retracted by the thickened portion of the casing. Therefore, the casing may be alternately turned in a tightening direction and in a loosening direction and the shaft will be turned with the casing only while the casing is turning in the loosening direction. If the nut is to be tightened, the shaft is shifted rearwardly to dispose its rear end in the pocket or seat 4 and, during this movement, the pawls 10 will ride over the beveled cam surface 19 into engagement with the thickened portion 17 of the casing and moved to retracted position. At the same time, the pawls 9 will move across the cam surface 18 and their spring will shift them outwardly into engagement with the ratchet teeth 15 and cause the shaft to turn with the casing only during turning of the casing in the tightening direction. In view of the fact that the springs 14 are disposed within the openings 12 and have their end portions engaged in the recesses 13, each spring serves to force companion pawls outwardly simultaneously and, since the arms of the pawls are engaged in the slots 11, the pawls will remain in engagement with the shaft and be braced while in extended operative position. The greatest pressure is applied to the turning tool engaged with the shank 3 when tightening a nut or drilling a hole and, therefore, the teeth 15 are provided in the rear end portion of the casing and the rear head 2 is formed with the recess 4 to brace the shaft against transverse play during a tightening operation.

Having thus described the invention, what is claimed is:

1. A device of the character described comprising a casing having a head at its rear end carrying a shank, a cap for the front end of said casing formed with a forwardly projecting sleeve, walls of the casing being formed internally with front and rear sets of ratchet teeth about the circumference of the casing, the portion of the walls of the casing between the sets of ratchet teeth being internally thickened and and having beveled front and rear side edges constituting cam surfaces, a shaft extending longitudinally in the casing and through the sleeve and projecting forwardly therefrom and provided with a socket at its front end, said shaft being formed with transverse openings spaced from each other longitudinally of the shaft and slots leading from the openings longitudinally of the shaft, pawls at opposite sides of the shaft having arms slidably engaged in the slots through opposite ends thereof, and springs in the openings having end portions engaging the pawls between arms thereof and urging the pawls outwardly for engagement with the ratchet teeth, said pawls having their outer ends formed with diagonally extending corners for engaging the cam surfaces at slides of the thickened portion of the casing wall and guiding the pawls onto the inner surface of the said thickened portion for holding the pawls of one set retracted while the pawls of the other set are in an extended position.

2. A device of the character described comprising a casing adapted for engagement with a turning medium and open at its front end, a head for the front end of said casing, a shaft passing through said head and shiftable longitudinally of the casing, walls of the casing being provided internally with front and rear ratchet teeth arranged in paths circumferentially of the casing and between the paths of ratchet teeth the walls being internally thickened to provide a circumferentially extending retainer surface, said shaft having its rear portion within the casing formed with transverse openings, springs in said openings, and pawls slidably engaged in the openings through opposite ends thereof, said pawls being urged outwardly for engagement with companion ratchet teeth by the springs, and the pawls in one opening being engageable with the thickened portion of the casing wall for retraction thereby when the shaft is shifted longitudinally to move the pawls in the other opening out of engagement with the thickened portion of the casing and allow movement of the last mentioned pawls into engagement with the companion ratchet teeth.

3. A device of the character described comprising a casing adapted to be turned about its longitudinal axis, a shaft extending into the casing through the front end thereof and shiftable longitudinally of the casing to adjusted positions, front and rear sets of circumferentially arranged ratchet teeth in said casing spaced from each other longitudinally of the casing, there being a circumferentially extending retainer surface in the casing between the front and rear sets of ratchet teeth, the portion of the shaft within the casing being formed with front and rear transverse openings having slots leading therefrom longitudinally of the shaft, springs in said openings, and pawls extending transversely of the shaft and urged outwardly from the shaft by the springs for engagement with companion ratchet teeth, said pawls having arms engaged in the slots to guide movement of the pawls, the pawls being shifted to retracted positions by contact with the retainer surface when moved into engagement therewith by shifting of the shaft longitudinally of the casing.

4. A device of the character described comprising a casing adapted to be turned about its longitudinal axis, a shaft extending into the casing through the front end thereof and shiftable longitudinally of the casing to adjusted positions, front and rear sets of circumferentially arranged ratchet teeth in said casing spaced from each other longitudinally of the casing, there being a circumferentially extending retainer surface in the casing between the front and rear sets of ratchet teeth, the portion of the shaft within the casing being formed with front and rear transverse openings, sets of front and rear pawls extending transversely of said shaft, the pawls of each set being at opposite ends of an opening, springs in the openings each having its ends engaging a set of pawls and urging the pawls outwardly to an extended position for engagement with companion ratchet teeth, and the pawls of one set being shifted to a retracted position by engagement with the retainer surface when the shaft is shifted longitudinally to move the other set of pawls into position for engaging companion ratchet teeth.

5. A device of the character described comprising a casing adapted to be turned about its longitudinal axis, a shaft extending into the casing through the front end thereof and shiftable longitudinally of the casing to adjusted positions, front and rear sets of circumferentially arranged ratchet teeth in said casing spaced from each other longitudinally of the casing, there being a circumferentially extending retainer surface in the casing between the front and rear sets of ratchet teeth, front and rear sets of pawls carried by said shaft within the casing, springs urging the pawls outwardly to extended position for engagement with companion ratchet teeth, and the pawls of one set being shifted to retracted position by engagement with the retainer surface when the shaft is shifted longitudinally to move the other set of pawls into position for engaging companion ratchet teeth.

VICTOR B. NOVAK.